Feb. 4, 1936.  H. M. CREIGHTON ET AL  2,029,612
ACTIVE RAY TREATING DEVICE
Original Filed Oct. 8, 1931   5 Sheets-Sheet 1

INVENTORS
Harry M. Creighton & Edward C. Berndt
BY
Bohleber + Ledbetter
ATTORNEYS

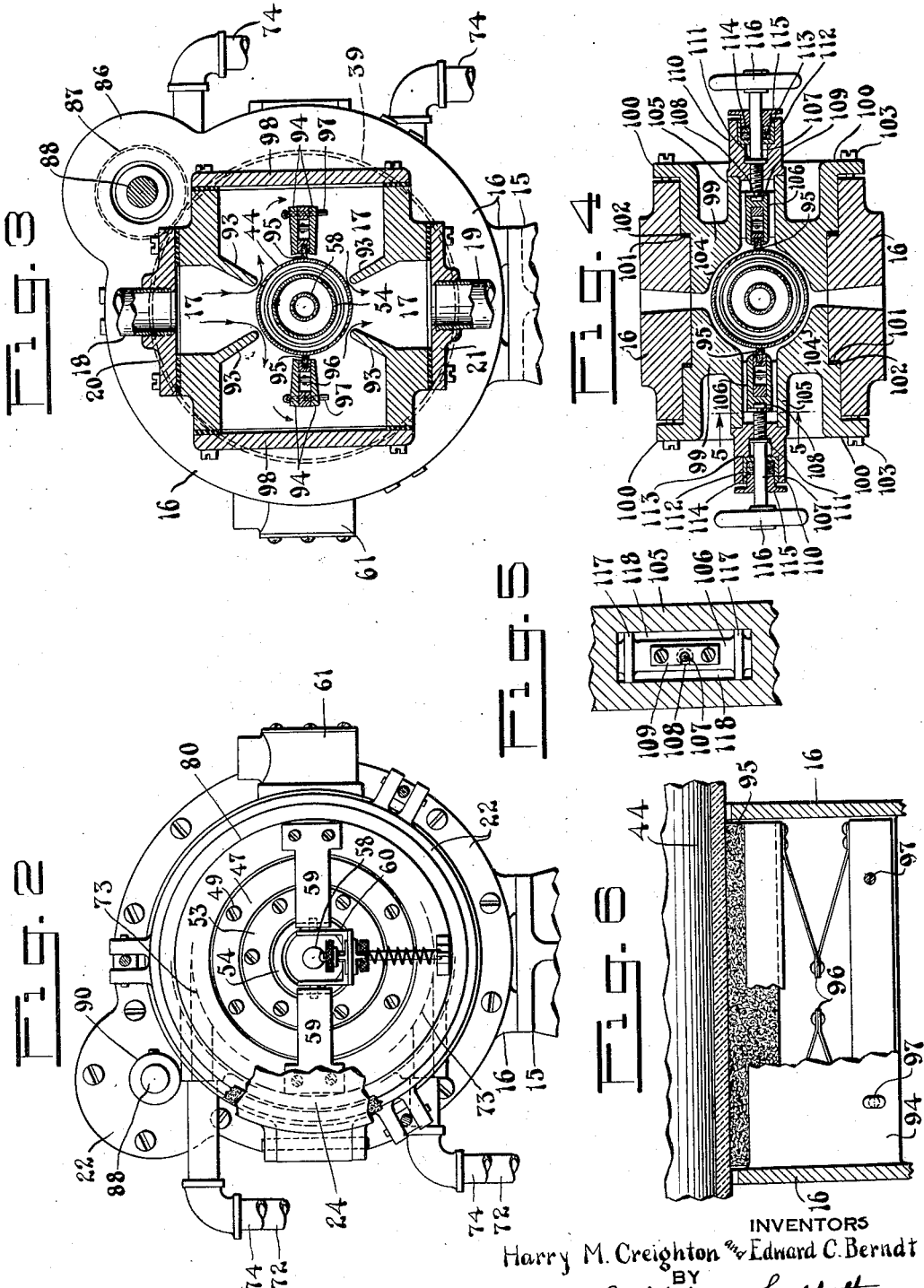

Feb. 4, 1936.    H. M. CREIGHTON ET AL    2,029,612
ACTIVE RAY TREATING DEVICE
Original Filed Oct. 8, 1931    5 Sheets-Sheet 3
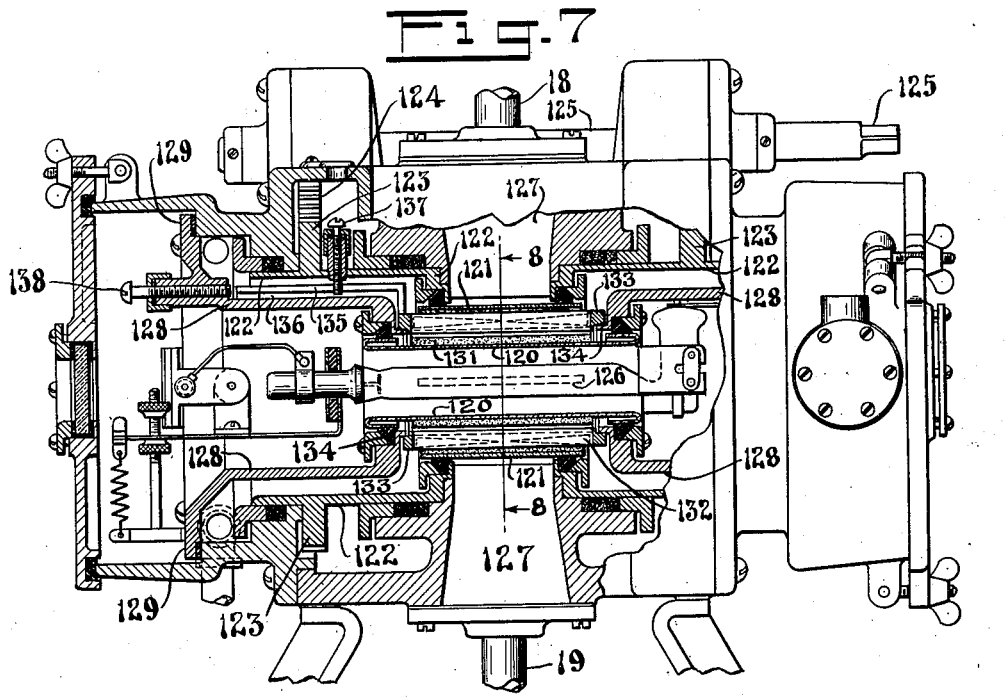
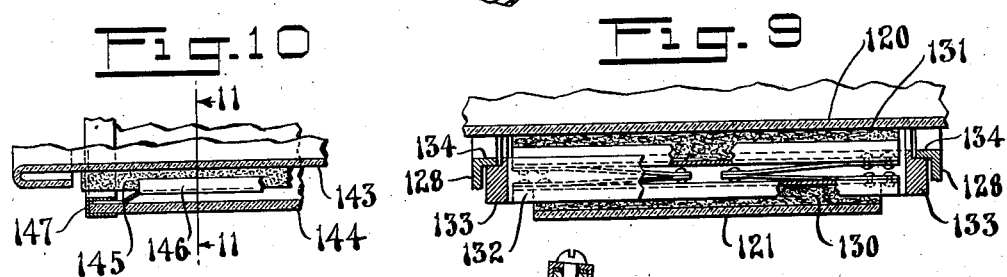
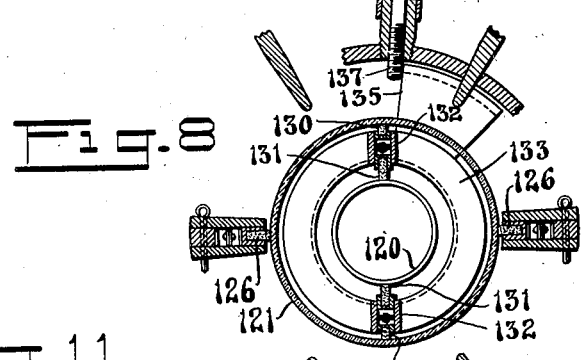
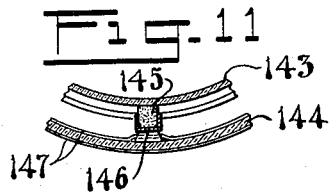
INVENTORS
Harry M. Creighton & Edward C. Berndt
BY
Bohleber + Ledbetter
ATTORNEYS

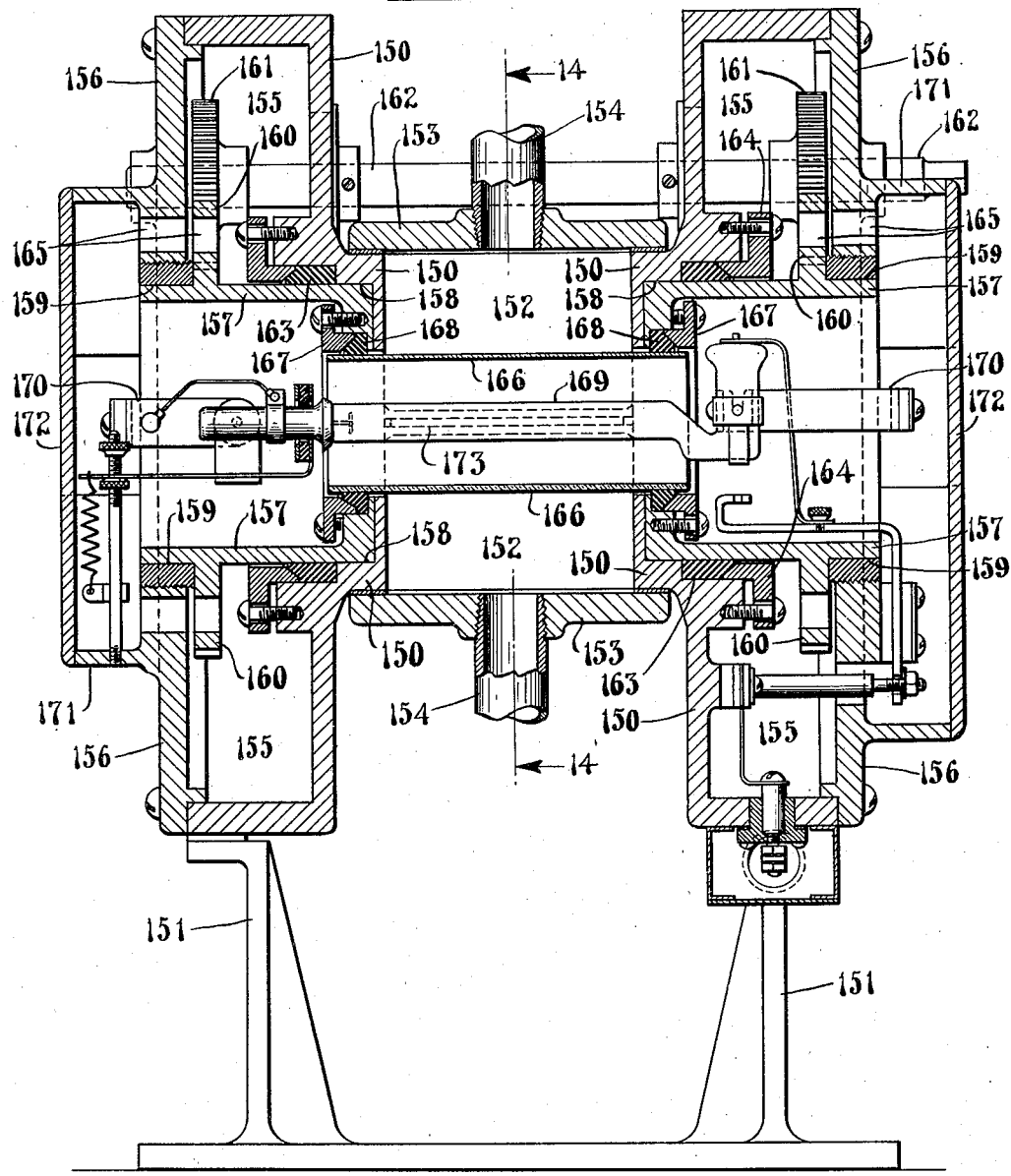

Feb. 4, 1936.    H. M. CREIGHTON ET AL    2,029,612
ACTIVE RAY TREATING DEVICE
Original Filed Oct. 8, 1931    5 Sheets-Sheet 5

INVENTORS
Harry M. Creighton and Edward C. Berndt
BY
Bohleber & Ledbetter
ATTORNEYS Patented Feb. 4, 1936

2,029,612

UNITED STATES PATENT OFFICE 2,029,612

ACTIVE RAY TREATING DEVICE

Harry M. Creighton, East Norwalk, and Edward C. Berndt, Norwalk, Conn., assignors to The R. U. V. Engineering Corporation, South Norwalk, Conn., a corporation of Delaware Application October 8, 1931, Serial No. 567,572
Renewed June 27, 1935

30 Claims. (Cl. 99—15)

This invention relates to apparatus adapted to treat substances with active rays in such a manner that the substance treated shall have imparted thereto or acquire by virtue of such treatment certain desirable characteristics usually those possessed or induced by the ray or rays utilized for the treatment. Particularly, the invention embodies an improved apparatus providing means for effectively activating all portions of the substance treated without requiring personal supervision to insure that the substance is uniformly exposed to the influence of the light rays, and moreover that the time of such exposure shall be sufficient to properly activate the substance.

It is generally known and commonly understood that active rays, such for example as ultra-violet rays or other irradiation from a source of ultra-violet light, have certain marked effects on substances; that such effects vary with the time the substances are exposed to the rays and also vary with the kind, quality, or wave length, of the irradiating rays. While certain desirable properties may be imparted to the substances upon a predetermined length of exposure to the rays, such effects may be utterly destroyed and the substance itself spoiled by excessive exposure. Since the distance of the substance from the source of active rays, at the time of exposure, also affects the character and degree of the activation thereof, means must be provided which will present all parts of the substance to the influence of the light rays at a substantially uniform distance from the light source. This is to avoid an overexposure of those portions of the substance proximate the source and under exposure of the more remote portions.

In the treatment of opaque or partially opaque substances, either in the liquid, solid or gaseous state, or in suspension, uniform exposure is extremely difficult of attainment and has prevented the successful treatment of these substances commercially. For example, it is frequently desirable to treat milk, oils, fruit juices, grains, cereals, water and other substances with active rays, not only to effect the sterilization or partial sterilization thereof, but to impart certain physiological properties thereto. Sufficient exposure, for example, of fruit juice, effects sterilization thereof and kills the organisms therein. Heretofore, this has been done by exposing a thin layer or film of the substance to the source of the active rays in order that the rays may penetrate the substance for a distance equal to or greater than the thickness of the layer. Thin layers and thin films, as they are somtimes referred to, are understood to be layers or films of substances having a depth or thickness less than the depth to which the rays from the light source will penetrate.

Moreover, certain desirable properties may be imparted to the substance by using rays of one wave length, or in other words rays from one portion of the ultra-violet spectrum rather than rays of another wave length or from another portion of the spectrum. Hence, it is desirable to provide means commercially adapted to filter the rays emanating from the light source and subject the substance being treated to such filtered or selected rays. It is also desirable to dissipate the heat generated by the ultra-violet lamp and we have found that where a liquid filtering medium is employed, such medium incidentally acts as a coolant with the usual beneficial results. However, at times when it is not desired to filter the rays, a coolant may be used which does not possess pronounced filtering properties and the means to be hereinafter described as filtering means may be understood to be equally applicable to the use of a cooling medium, per se.

It has also been found, probably due to the action of ultra-violet rays on the substance treated or the filtering medium, that particles of the substance and filtering medium become deposited or adhere to the quartz tubes, which separate the substance and medium from the quartz lamp, to such an extent that the quantity of the light rays emanating from the light source and transmitted through the tube to the substance is materially reduced and the efficacy of the machine proportionately impaired. Substances so deposited receive an excessive treatment and if during the operation of the machine such overtreated portions of the substance are belatedly knocked off and become mixed with the substance, they impart deleterious properties to the remainder of the substance being treated.

It has been found that the limitations of apparatus heretofore used in the irradiation of substances have made them ineffectual in a measure, in treating certain substances. It will at once be apparent that any means for irradiating large quantities of substances, which cannot be uniformly treated in the form of thin films, will be highly useful.

One of the objects of our present invention is the production of an improved active ray treating machine adapted to economically treat various substances in commercial quantities.

Another important object is to produce a machine of the class described comprising means for wiping the surfaces of one or more transparent tubes mounted therein, without changing the relationship between the wipers, baffles, inlet and outlet ports of the machine.

Another object is to construct such a machine so that during the operation thereof certain portions of the machine may be cleaned without dismantling the machine.

Another object is to provide means whereby the machine may be readily and easily dismantled, as required, to clean other portions and also to facilitate the removal and replacement of parts when the machine becomes worn or damaged.

Another object is to provide means for mounting concentrically spaced quartz tubes in machines of the class described, in such manner that the substance to be treated may be coursed about said tubes, in combination with means for introducing a cooling or filtering medium through the space formed between the tubes and means for wiping the surfaces of the quartz tubes which come in contact with either the substance to be treated or the cooling or filtering medium.

Another object is to produce an irradiating machine comprising means for mounting concentric quartz tubes or shells or cylinders, as they may be called, whereby said tubes may be simultaneously rotated.

For reasons which will hereinafter appear, or be specifically referred to, another object is to provide means for withdrawing the tube wipers from wiping position when not in use and provide stop means to limit the extent of the movement of the wipers from and toward the tubes.

Another object is to provide baffles in a machine of the class described of such form and construction as to induce a scouring action in the substance being treated as it is being coursed through the machine past the quartz tube and reduce the amount of tube cleaning to be required of the wipers.

Another object is to provide means for introducing and withdrawing the filtering or cooling medium from the space between a pair of rotatable concentric quartz tubes.

Further objects and advantages of our present invention will be specifically referred to below or become apparent from a description of the apparatus illustrated by the accompanying drawings.

Our present invention comprises improvements in machines of the class described and claimed in our joint application Serial No. 418,027, filed January 2, 1930.

Referring to the drawings which form a part of our specification:

Figure 1 shows a side elevational view, partly in section, of our ray treating machine wherein two concentric tubes are independently mounted and adapted to be simultaneously rotated; a space between the tubes adapted to contain a medium for filtering the light rays emanating from a light source to effect the irradiation of a substance by selected or filtered rays; and means for cleaning the surface of the tube which comes in contact with the substance being treated.

Figure 2 is a front elevation of the machine shown in Figure 1, with the cover plate broken away to show the mounting for the front end of an ultra-violet lamp.

Figure 3 is a sectional elevation of the machine, taken on line 3—3 of Figure 1, showing the relationship between a pair of tube wipers, baffles and a pair of concentric quartz tubes.

Figure 4 shows a modified form of the baffles shown in Figure 3 and the relationship between said baffles and tubes, the ends of the baffles being widened out near the quartz cylinder so as to extend the surface and duration of contact and exposure of the substance being treated to the light rays, and a mechanism, taken as a whole, which is easily dismantled for cleaning.

Figure 5 shows a detail view taken on line 5—5 of Figure 4.

Figure 6 shows a detailed view of a quartz cylinder and wiper therefor.

Figure 7 shows a machine somewhat similar to that shown in Figure 1 except that wiping means is provided for cleaning all the surfaces of the quartz tubes which come in contact with either the substance to be treated or the filtering medium.

Figure 8 is an enlarged fragmental sectional view taken on the line 8—8 of Figure 7 showing the ends of the quartz tubes and wipers.

Figure 9 shows an enlarged fragmental view of the tubes and one of the wipers shown in Figure 7.

Figure 10 shows a modified form of wiper which is adapted to be mounted on the end of the quartz tube beyond the packing ring.

Figure 11 is a fragmental section view taken on the line 11—11 of Figure 10.

Figure 12 shows a sectional view of an active ray treating machine having a single revolving quartz tube disposed between the source of light rays and the substance to be treated, together with wipers for cleaning the said tube.

Figure 1:
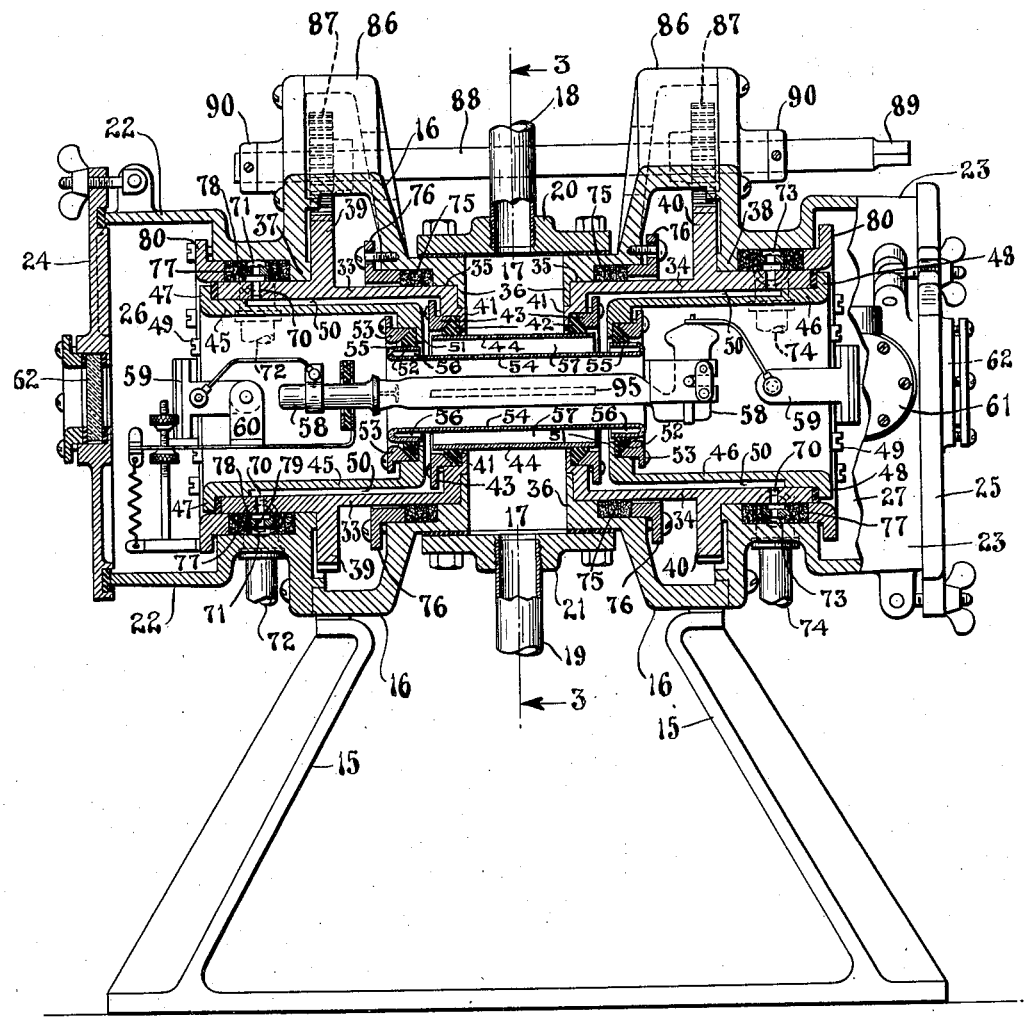

Referring to the above described drawings in which reference numerals are employed to designate corresponding parts illustrated in the several figures thereof, and particularly to Figures 1, 2, and 3 thereof, it will be seen that our machine comprises a base or support 15 adapted to rest upon the floor or any suitable mounting and a housing or frame 16, adapted to support the various parts of the machine to be hereinafter described and also to form a treating chamber 17 to which the substance to be treated may be conducted, or from which it may be withdrawn, by means of pipes 18—19. It is immaterial which of the pipes 18 and 19 is used as an inlet and which pipe is used as an outlet because the treatment of substances may be effected irrespective of the direction in which it is passed through the machine. Pipes 18—19 are secured to the housing 16 by means of flanges 20 and 21 into which they are screwed. Castings 22 and 23 are secured to the front and back of the housing 16, respectively, and are provided with cover plates 24 and 25 which are hinged, locked or adapted to be secured to said castings, respectively, by any suitable means. In effect, when the castings 22 and 23 are secured to the housing 16, they become a part of the frame of the machine, and it will be seen that the structure thus far described comprises a treating chamber 17, see Figures 1 and 3; a front chamber 26 formed by the casting 22 and cover plate 24; and a back chamber 27 formed by the casting 23 and cover plate 25, see Figure 1.

Cylindrical tube supports or carriers 33 and 34 are journalled in the chambers 26 and 27 between a bearing 35 and a flange 36 formed on the front and back of the housing 16, and circular flanges 37 and 38 formed on the inside of the castings 22 and 23 respectively. The tube supports 33 and 34 are provided, respectively, with spur gears 39 and 40 through which the supports are adapted to be rotated by means to be hereinafter described. The gears are constructed and positioned on the supports in such a manner that the flanges 37 and 38, on the castings 22 and 23 and the flanges 36 on the housing 16, above described react to prevent longitudinal displacement thereof and at the same time enable them to be rotated about the longitudinal axis of the machine.

The inner ends of the supports 33—34 are provided with flanges 41, packing rings 42, made of rubber or any other suitable packing substance, and packing glands 43 whereby the supports are adapted to carry or support a quartz tube, shell or cylinder 44 in a transversely disposed position with respect to the treating chamber 17. While we define the tube 44 as being made of quartz it is to be understood that said tube, and those to be hereinafter described and claimed, may be made of any substance transparent to the active rays used for irradiation. The ends of the quartz tube 44 are sealed and held securely in the supports 33 and 34 by drawing the glands 43 snugly against the packing rings 42, by any suitable means, so as to compress the rings tightly against the outside surface of the quartz tube. It will now be apparent that the quartz tube 44, being rigidly secured to the supports 33 and 34, will be rotated thereby whenever the supports are rotated.

A second pair of tube supports 45 and 46, provided with flanges 47 and 48 at their outer ends, are adapted to be mounted on the supports 33 and 34, above described, respectively, by means of screws 49 passing through the flanges 47 and 48 into the ends of the supports 33 and 34. In order to make a tight joint between the flanges 47 and 48 and the supports 33 and 34, obviously a gasket may be interposed between the parts, if desired.

The outside diameters of the supports 45 and 46 are made somewhat smaller than the inside diameters of the supports 33 and 34, except for a short distance near the flanges 47 and 48 which is finished to a size which will permit them to fit snugly inside of the supports 33 and 34 and to be maintained in a position centrally thereof, so as to provide a cylindrical chamber 50, at each side of the machine, between the tube supports.

The inner end of each of the supports 45 and 46 is provided with a flange 51, a packing ring 52 and a packing gland 53, which parts, in all material respects, are similar to the corresponding parts just described in connection with the supports 33 and 34, and are adapted to support or carry a quartz tube, shell or cylinder 54 coaxially disposed within the quartz tube 44. Each end of the tube 54, however, is flared outwardly and bent back upon itself, so to speak, to form a reversely extending cylindrical portion which in effect produces a cylindrical collar 55 formed integral with the tube 54 and spaced therefrom to form a chamber-portion 56 between the tube 54 and the collar 55. The quartz tube 54 is sealed securely in the supports 45 and 46 by drawing the glands 53 snugly against the packing rings 52, in a manner similar to that just described in connection with the tube 44 except that the packing rings in the case of the tube 54 are compressed against the collars 55, on the ends of the tube, instead of upon the tube itself.

It will be seen that by means of the structure just described, since the tube 54 is mounted within the tube 44 and rigidly secured to the tube supports 45 and 46, which supports are fastened to the supports 33 and 34, that the tubes 44 and 54 are adapted to be rotated as a unit whenever the tube supports 33—34, 45—46, are rotated. Aside from the expediency it is not necessary to mount the tube 54 to be rotated with the tube 44 inasmuch as wipers for the tube 54 are not shown in the structure illustrated in Figure 1 and we shall describe hereinafter means for stationarily mounting a tube similar to 54. One of the reasons for providing means for rotating both tubes simultaneously is to permit the precipitates which may form in the chamber 57 and settle on the tube 54 to drop off when the tube is rotated. Moreover as will be hereinafter pointed out the tube may be rotated at high velocity to centrifugally throw off particles which may collect thereon. The structure also shows that a cylindrical chamber 57 is formed between the tubes 44 and 54 since the inside diameter of the former is greater than the outside diameter of the latter.

In the above description, reference has been made to chambers 50 between the carriers 33—45 and 34—46, respectively, and also to the chamber portions 56, between the tube 54 and the collars 55; however, it will now become apparent from an inspection of Figure 1 of the drawings that these chambers are in fact portions of one continuous chamber formed between the carriers 33—34, 45—46 and the quartz tubes 44 and 54. Hence, in the interest of brevity we shall refer hereinafter to the chambers 50, chamber-portions 56, and the chamber 57 collectively, as a chamber 50—57 except when it is desired to refer specifically to the component parts thereof.

A mercury vapor lamp 58 or other source of active rays is mounted within the tube 54 by any suitable means and is adapted to be illuminated by electric current, supplied from any suitable source. Inasmuch as the mercury vapor lamp per se, its operating means, its mounting means and the manner of supplying electric current thereto form no part of our present invention, we shall not describe it, other than to say that the lamp is mounted on horizontally disposed supports 59 located at each end of the machine, and is equipped with a tilting mechanism 60 of any well known type for starting the current flow or arc through the lamp 58. Numeral 61 indicates a junction box, through which electric service wires are brought to the lamp 58. The numeral 62 represents glass lenses and mountings therefor by which peep holes are provided in the covers 24 and 25 of the front and back chambers 26 and 27, through which the operation of the lamp may be observed without opening the covers and exposing the lamp 58 to dirt and dust, or permit of unauthorized adjustments or the tampering of meddlers.

We provide for dissipating the heat generated by, and for filtering or absorbing certain of the rays emanating from, the lamp 58 by a cooling and/or filtering medium adapted to circulate through the chamber 50—57. In this connection a row of port holes 70 around the outer ends of the supports 33 and 34 are provided whereby communication is established between the chamber 50—57, and a clearance space between the supports 33 and 34 and the castings 22 and 23. Inlet ports 71 are formed in each side of the casting 22 opposite the row of ports 70 whereby the filtering medium is conducted to the chamber 50—57 through the ports 70 and 71 by means of pipes 72, see Figure 2. At the opposite side of the machine outlet ports 73 are formed at each side of the casting 23 and opposite the row of ports 70 whereby the circulating medium may be conducted from the chamber 50—57 by means of pipes 74, see Figures 2 and 3. As a matter of fact, it is immaterial which direction the cooling or filtering medium is coursed through the chamber and hence the ports 71—73 just described, as inlet and outlet ports, may be used interchangeably for this purpose as desired.

Figure 15:
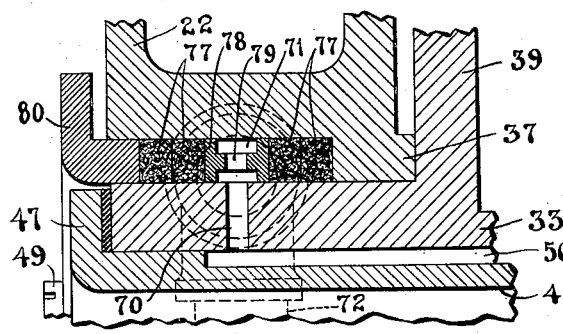
Figure 15 is an enlarged detail view taken from Figure 1 showing the manner in which communication is established between stationary inlet and outlet ports and a chamber formed between a pair of revoluble concentric spaced tubes and carriers.

The inside ends of the supports 33 and 34 are caulked, or packed, to prevent leakage of the substance being treated in the chamber 17 to the outside of the machine, and at the same time permit said supports to be rotated, as desired, by packing rings 75 and packing glands 76; while the outside ends of the supports are sealed by packing rings 77 to prevent leakage of the filtering medium. A ring 78, which is H-shaped in cross section and provided with a plurality of radially disposed holes 79, is disposed between the packing rings 77 to form an annular opening between the ports 71 and 73, above referred to, and the port holes 70. The rings 77 and 78 are adapted to be drawn down to the proper sealing tension by packing glands 80, see Figure 15.

The housing 16 is enlarged to provide a casing 86 for a pair of gears 87, mounted on a shaft 88, and journalled in the casing. The gears 87 are mounted on the shaft 88 in such a position as to mesh with and be adapted to rotate the spur gears 39—40, mounted on supports 33—34, at the same angular velocity, when the shaft 88 is rotated by any suitable means. In the present embodiment of our invention, we have made the end 89 of the shaft 88 square so as to receive a complementarily shaped crank, not shown, for rotating the tube supports. Collars 90 are pinned to the shaft 88 to prevent the longitudinal displacement thereof.

Referring now to Figure 3 it will be seen that baffles 93, projecting from the top and bottom of the chamber 17 and extending parallel to the axis of the tube 44, are provided to direct the flow of the substance being treated past the tube 44 whereby it is treated by rays emanating from the lamp 58. Supports 94, see Figure 6, secured to the housing 16 and also extending parallel to the axis of the tube 44, are provided to removably receive wipers 95, which by any suitable resilient means 96 are urged toward the surface of the tube 44 such that when the tube is rotated the surface thereof is driven past the wipers whereby any deposited particles which may have collected thereon are scraped or cleaned off by the wiping action thereof. The wipers are retained in supports 94 by cotter pins 97. The side portions of the chamber 17 are constructed in the form of plates 98 which may be removed to gain access to the interior of the chamber. The ends of the baffles are spaced from the tubes 44 sufficiently to permit the passage of substance containing pulp cells and other semi-opaque bodies and, after passing one set of baffles, is agitated or mixed by being required to pass around wipers 95 and supports 94 before passing a second set of baffles disposed near the outlet pipe 19. The treatment, mixing and retreatment which takes place in the chamber 17 is usually sufficient for all practical purposes. However the substance may be coursed thru other similar machines connected in series or retreated in the same machine if desired.

Figure 4 shows a modified form of the device, just described in connection with Figure 3, in which baffles 99, for directing the flow of the substance, are mounted on, or constructed integral with, cover plates 100 and are adapted to fit against shoulders 101 and gaskets 102 in the housing of the machine when the screws 103 are tightened. The baffles 99 extend parallel to the axis of the tube 44 for a distance equal to the width of the treating chamber and are widened out, as at 104, to provide a more extended surface of contact between the substance and tube and increase the time during which the substance is subjected to the action of the rays emanating from the light source. Moreover, by constricting the chamber 17 with baffles having a contour similar to that of a section of the tube, a scouring action is imparted to the substance, due to the high velocity with which it passes the tube, and reduces the amount of cleaning which the wipers 95 are required to do.

Since increasing the relative movement between the substance being treated and the tube 44 tends to increase the scouring action, it may be found desirable to rotate the tube 44 continuously by connecting the shaft 88 in any suitable manner to a source of power (not shown). It has also been found desirable to rotate the tube at a high velocity because particles which collect on the outside surface will be thrown off. We have found that the tendency for particles to form on the surface of the tube is inversely proportional to the surface velocity of the tube. Moreover the tendency for particles to collect is reduced because the substance itself which comes in contact with the surface of the tube tends to be thrown off centrifugally with reference to the tube and in a measure counteracts the tendency of the particles to adhere to the tube. Due to these actions it is not always necessary to use wipers. In cases where it is necessary to employ wipers, however, it may be necessary to continuously rotate the tube to insure uniform cleanliness during the period of treatment. To prevent the wipers 95 from remaining in contact with a rotating tube at all times, and also to protect them from the action of the light as much as possible, we provide means for withdrawing the wipers from the tube when not in use, which comprises a guideway 105, in which wiper holders 106 are slidably mounted. A threaded adjusting stem 107, having a round head 108, is rotatably held in the wiper holder 106 by a plate 109, see Figure 5. The guideway 105 is covered by a cap 110 which is tapped to receive the threaded portion of the stem 107. A collar 111 is secured to the stem 107 to limit the inward movement thereof when it comes in contact with the bottom of the cap 110 and to prevent the wiper 95 from being injuriously pressed against the cylinder 44. The mouth of the cap 110 which surrounds the stem 107 is bored out to receive a bushing 112, having an inwardly projecting flange 113 which serves as a stop to limit the distance which the stem 107, and hence the wiper 95, may be withdrawn from the cylinder 44. The flange 113 also serves as a seat for packing 114 by which the stem 107 is packed in the cap 110 by a packing gland 115 in the usual way. A hand wheel 116 is mounted on the end of the stem 107 by which the stem may be turned to move the wiper 95 toward and from the cylinder 44 within the limits fixed by the bottom of the cap and the flange 113. The wiper holders 106 are constructed with ribs 117, which bear in the guideways 105, providing passageways 118 around the wipers thru which the substance is adapted to pass when the wipers are in contact with the cylinder 44.

Figure 7 illustrates a machine somewhat similar to that shown in Figure 1, except that wiper means is provided for cleaning the outside surface of a tube 120 which tube corresponds to the tube 54 in Figure 1, as well as the inside surface of a tube 121, corresponding to the tube 44 in Figure 1, in addition to providing means similar to that above described in connection with Figures 3, 4, and 6 for also cleaning the outside surface of tube 44.

The tube 121 is mounted in a pair of tube supports 122 which may be rotated through spur gears 123, mounted thereon, when their companion pinions 124 are rotated by the shaft 125. Wipers 126 similar to those shown in Figures 1 and 3 are yieldably mounted in the chamber 127 in contact with the tube so that when it is rotated the wipers will clean the outside surface thereof. These parts need not be described with greater particularity in view of their general similarity in location, construction and operation to the corresponding parts shown in Figure 1 and above described.

The tube 120, however, is mounted in a pair of stationary tube supports 128 fixed to the frame of the machine at 129. Wipers 130 and 131, Figures 8 and 9, are yieldably mounted in guideways 132 having each end secured to the face of a ring 133. The rings 133 are adapted to rotate freely on a pair of cylindrical projections 134 formed on the inner ends of the stationary tube carriers 128. One of the rings 133 carries a driving arm 135 disposed in a chamber 136 between the supports 122 and 128 and is adapted to be driven by a screw 137 mounted in the support 122, with the result that when the support 122 is rotated the wipers are revolved about the tube 120 and clean the outside surface thereof because the tube 120 remains stationary. To wipe the inside surface of the tube 121 the screw 137 is withdrawn from the path of the arm 135 and a set screw 138, mounted in the support 128, is brought to bear against the end of the arm 135 to hold the wipers in fixed relationship with respect to the tube 120 so that when the tube 121 is rotated the wiper 130 will clean the inside surface of the tube 121.

Figures 10 and 11 illustrate a pair of concentric quartz tubes 143 and 144 similar to those shown in Figure 7 and a wiper 145 mounted in a resilient support 146 secured to the end of the tube 144, beyond the packing, by a clamping ring 147. At times this construction will be found useful in connection with wipers mounted in the treating chambers of the machine, when it is desirable to simultaneously clean the outside surfaces of both tubes.

Figure 13:
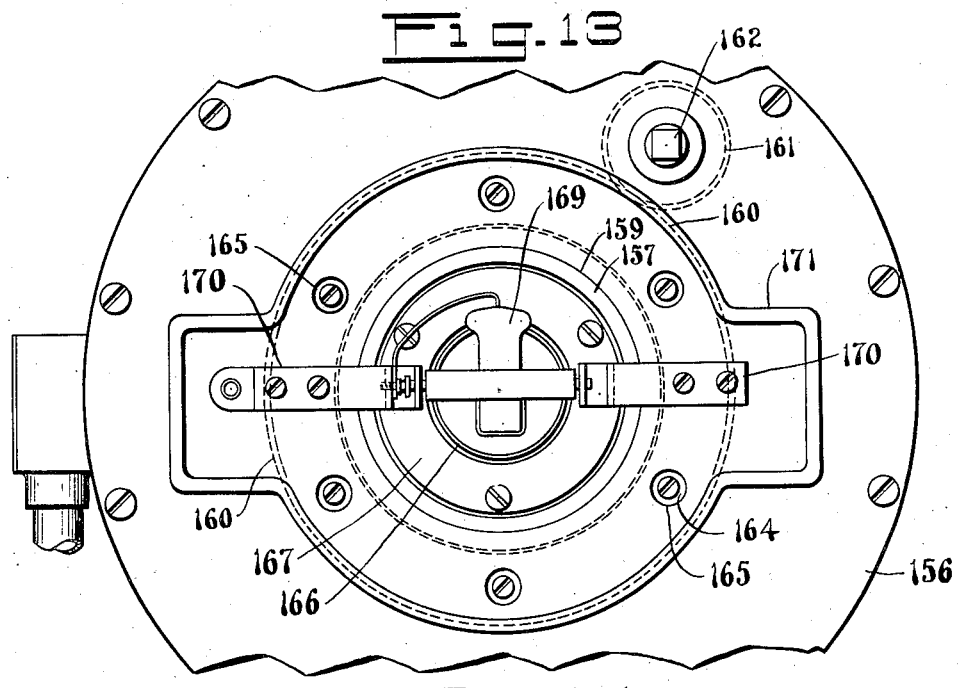
Figure 13 is a fragmental end view of the machine shown in Figure 12 with the cover plate removed to show the mounting for the back end of the lamp.
Figure 14:
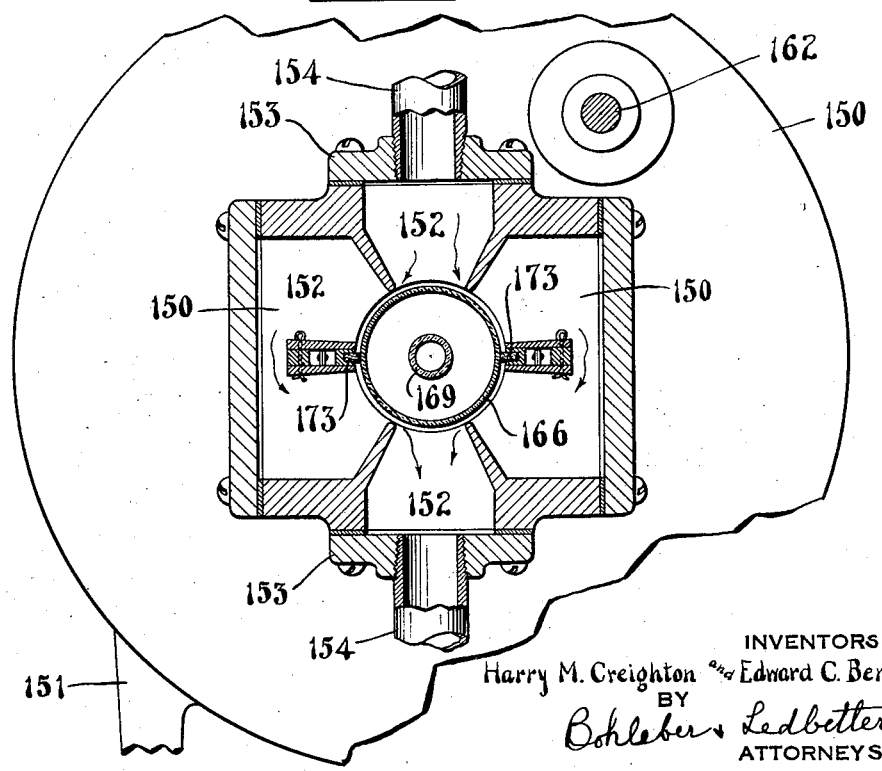
Figure 14 is a sectional elevational view taken on line 14—14 of Figure 12 showing the treating chamber of the machine and the relationship between the quartz tubes, baffles and the wipers of the machine.

Figures 12 and 13 show a simplified form of an irradiating machine having a housing 150 adapted to rest upon any suitable support 151. A treating chamber 152, in the housing 150, is closed at the top and bottom by flange 153 carrying pipes 154 through which the substance to be treated may be conducted to and from the chamber. Each side of the housing 150 is flared to form a recess or chamber 155 adapted to be closed by cover plates 156. A pair of tube supports 157 having their inner ends journalled at 158 and their outer ends journalled in the cover plates 156, at 159, are adapted to be simultaneously rotated at the same angular velocity through gears 160, mounted on the supports, and pinions 161 which are adapted to be driven by a shaft 162 in any suitable manner, not shown. Packing rings 163, disposed about the supports near the journals 158, are held in place by packing glands 164 and prevent leakage of the substance past the journal 158. Holes 165 are formed in the cover plates 156 and gears 160 through which the screws of the packing gland 164 may be adjusted when the support 157 and cover plates 156, are in place. A quartz tube 166 is mounted in the treating chamber 152 by having its ends secured in the supports 157 by drawing a packing gland 167 against a packing ring 168 whereby the ring is pressed against the outside of the tube 166 and the tube is thereby sealed to the supports 157 and adapted to rotate therewith. A mercury vapor lamp 169 is disposed within the tube 166 and is supported at its ends by brackets 170 secured to and projecting from the covers 156. The lamp 169 is similar to that above described and is connected to an electric circuit and equipped with means for starting it in the usual way. Extensions 171 are formed on the cover plates 156 to which covers 172 are secured to protect the lamp 169 and its associated mechanism from dust and dirt as mentioned above described in connection with Figure 1. In Figure 14 showing a section taken on line 14—14 of Figure 12, it will be seen that stationary wipers 173 are mounted in the treating chamber 152 and that said wipers and mountings are similar to those already described.

It will now be apparent that one of the important features of our present machine, over machines in which tube wipers are revolved about the tube, is that by revolving the tubes instead of the wipers, the wipers and means connected thereto are never caused to pass the inlet or outlet openings of the machine to obstruct the flow of the substance being treated, and hence the tubes may be wiped during the operation of the machine without impairing its efficiency or affecting the treatment of the substance.

Another important feature in a device of this kind is that the baffles 93 may be constructed integral with the housing 16 so that all the substance being treated will be required to pass between the baffles and the tube 44. In machines having movable baffles, or movable sections on the baffles, substance may leak past the joint in the baffles, or between the baffle and the housing, and thereby pass through the machine without receiving as thorough treatment as if it had passed between the ends of the baffles and the light source. Moreover, since the tendency toward leakage varies inversely as the distance between the baffles and tube surface, or in other words, directly as the resistance to its passage through the machine, the distance between the ends of the baffles and the tube in our present machine may be made less than in other types of machines in which provision is made for wiping the tube surfaces.

Having fully described our invention and the operation of a machine embodying the same in connection with the description of its structural details we need only to point out that such machines are particularly suitable for irradiating food substances because all portions of the substances are subjected to a uniform treatment and the construction of the treating chamber of the machine is such that it contains what seems to be a minimum number of parts to the end that it may be readily cleaned. Moreover, the tube supports and means for rotating the same may be easily removed through openings in the sides of the machine to facilitate making repairs of the parts when required and to inspect the interior of the machine.

While we have described what now seems to us to be the preferred embodiment of our present invention, we do not expect to be limited to the details of construction herein shown, because obviously construction details are susceptible of modification without departing from the spirit of our invention nor exceeding the scope of the appended claims.

What we claim to be new, and desire to cover by Letters Patent, is:

1. A machine for treating substances with active rays comprising a treating chamber, a source of active rays, and a transparent tube between said treating chamber and ray source, in combination with wiper means for wiping a surface of said tube, said tube, wiper means, and chamber defining a predetermined course to be traversed by the substance during the treament thereof, and mechanism for rendering said wiper means operable without changing said course, said mechanism comprising means for rotating said tube.

2. A machine for treating substances with active rays comprising a treating chamber, a pair of concentric transparent tubes disposed within said chamber, a source of active rays disposed within said tubes, a tube wiper in contact with the outside tube, and means for rotating said tubes as a unit about the ray source and past the wiper to wipe a surface of the outside tube.

3. A machine for treating substances with active rays comprising a chamber adapted to receive the substance being treated, a pair of spaced, concentric, rotatably mounted transparent tubes, disposed within said treating chamber and forming a chamber between said tubes, means for rotating said tubes and means for introducing a fluid medium into, or for withdrawing such medium from, the chamber between said tubes while said tubes are being rotated.

4. A machine for treating substances with active rays comprising a chamber for the substance being treated, a pair of spaced, concentric, rotatably mounted quartz tubes, disposed within said treating chamber, and forming a chamber between said tubes, a source of active rays disposed within said tubes, means for rotating said tubes about said ray source, and means for introducing a fluid medium into, or for withdrawing such medium from, the chamber between said tubes while said tubes are being rotated.

5. A machine for treating substances with active rays comprising, a treating chamber, a source of active rays, a pair of concentric quartz tubes disposed between the said treating chamber and ray source forming a filter chamber, means for rotating said tubes, and means through which a fluid filtering medium may be supplied to or withdrawn from said filter chamber while said tubes are being rotated.

6. A machine for treating substances with active rays comprising a treating chamber, a rotatably mounted transparent tube disposed within said chamber, a tube wiper in contact with the surface of said tube, said tube, chamber, and wiper, defining a predetermined course to be traversed by the substance during the treatment thereof, and means for producing relative movement between said wiper and tube to wipe the surface thereof without changing said course.

7. A machine for treating substances with active rays comprising a treating chamber, a rotatably mounted transparent tube disposed within said chamber, a tube wiper mounted within said chamber and adapted to be maintained in contact with the surface of said tube, said tube, chamber, and wiper, defining a predetermined course to be traversed by the substance during the treatment thereof, and means for rotating said tube to wipe the surface thereof without changing said course.

8. A machine for treating substances with active rays comprising a closed treating chamber, a rotatably mounted quartz tube disposed within said chamber, a tube wiper in said chamber adapted to be brought into contact with the surface of said tube, means operable from the outside of the chamber for moving said wiper toward and from said tube, and means for rotating said tube to wipe the surface thereof.

9. A machine for treating substances with active rays comprising, a housing, a quartz tube rotatably mounted in said housing, a substance treating chamber formed by said housing and tube, and wiper means mounted in said treating chamber adapted to wipe the surface of said tube when the latter is rotated with respect thereto, said wiper means comprising means for moving the wiper toward and from said tube in a plane perpendicular to the axis of said tube, and a stop on said movable means to limit the movement of said wiper.

10. A machine for treating substances with active rays comprising, a substance treating chamber, a source of active rays, a pair of concentric quartz tubes forming a filter chamber disposed between said ray source and treating chamber, wiper means mounted in the treating chamber and adapted to wipe the outside surface of the outside tube when said tube is rotated with respect thereto, a second wiper means disposed within said filter chamber and adapted to wipe the tube surfaces of said chamber when rotated with respect thereto, and means for simultaneously rotating the outside tube and the wiper means disposed within the filter chamber to simultaneously wipe the outside surfaces of both tubes.

11. A machine for treating substances with active rays comprising, a substance treating chamber, a source of active rays, a pair of concentric quartz tubes forming a filter chamber disposed between said ray source and treating chamber, wiper means mounted in the treating chamber and adapted to wipe the outside surface of the outside tube when said tube is rotated with respect thereto, a second wiper means disposed within said filter chamber and adapted to wipe the tube surfaces of said chamber when rotated with respect thereto, and means for locking the wiper means in the filter chamber against rotation, and means for rotating the outside tube to simultaneously wipe both surfaces of said tube.

12. A machine for treating substances with active rays comprising, a substance treating chamber, a source of active rays, a pair of concentric quartz tubes forming a filter chamber disposed between said ray source and treating chamber, means for rotating the outside tube, wiper means rotatably mounted within said filter chamber and adapted to wipe the tube surfaces of said chamber, and means for operatively connecting said wiper means to the means for rotating the outside tube to wipe the outside surface of the inside tube when said rotating means is operated.

13. A machine for treating substances with active rays comprising, a substance treating chamber, a source of active rays, a pair of concentric quartz tubes forming a filter chamber disposed between said ray source and treating chamber, means for rotating the outside tube, wiper means rotatably mounted within said filter chamber and adapted to wipe the tube surfaces of said chamber, and means for holding said wiper means against rotation when said tube rotating means is operated to wipe the inside surface of the outside tube.

14. A machine for treating substances with active rays comprising, a treating chamber, a pair of spaced independently mounted concentric quartz tubes, one of which is adapted to be rotated while the other remains stationary, means for rotating one of said tubes, and wiper means mounted in fixed relationship with respect to the rotatable tube and adapted to wipe a surface of the stationary tube when said rotatable tube is rotated, in combination with wiper means disposed in the treating chamber and rendered operable when said tube rotating means is operated.

15. A machine for treating substances with active rays comprising, a substance treating chamber having wiper means disposed therein, and a source of active rays, in combination with a second chamber between said treating chamber and ray source formed by a pair of concentric quartz tubes, said wiper means being in contact with one of said tubes, a double edged wiper disposed within said second chamber and adapted to wipe the tube surfaces of said second chamber, and means for rendering said wiper means and wiper operable to wipe surfaces of said tubes.

16. A machine for treating substances with active rays comprising, a treating chamber, a pair of spaced independently mounted concentric quartz tubes, one of which is adapted to be rotated while the other remains stationary, means for rotating one of said tubes, and wiper means mounted on the rotatable tube and adapted to wipe a surface of the stationary tube when said tube is rotated, in combination with wiper means disposed in the treating chamber and rendered operable when said tube rotating means is operated.

17. A machine for treating substances with active rays comprising, a pair of spaced independently mounted concentric quartz tubes, one of which is adapted to be rotated while the other remains stationary, means for rotating one of said tubes, wiper means mounted on the ends of the rotatable tube by means of clamping rings secured to said tube and adapted to wipe a surface of the stationary tube when said tube is rotated, in combination with wiper means disposed in the treating chamber and rendered operable when said tube rotating means is operated.

18. A machine for treating substances with active rays comprising a treating chamber, a pair of concentric transparent tubes disposed within said chamber, a source of active rays disposed within said tubes, a tube wiper in contact with the outside tube, said chamber, outside tube, and wiper defining a predetermined course to be traversed by the substance during the treatment thereof, and means for rotating the outside tube about the ray source and past the wiper to wipe a surface thereof.

19. A machine for treating substances with active rays comprising a treating chamber, a rotatably mounted transparent tube disposed within said chamber, a tube wiper in contact with and circumferentially fixed relative to the surface of said tube, said chamber, tube, and wiper defining a predetermined course to be traversed by the substance during the treatment thereof, and means for rotating said tube to produce relative movement between said wiper and tube to wipe the surface of the latter, without changing said course.

20. A machine for treating substances with active rays comprising a treating chamber, a rotatably mounted quartz tube disposed within said chamber, a tube wiper adapted to be brought into contact with the surface of said tube, means for moving said wiper toward and from said tube in a plane perpendicular to the axis of said tube, said means comprising a stop to prevent the wiper from being injuriously pressed against the tube, and means for rotating said tube to wipe the surface thereof.

21. A machine for treating substances with active rays having a treating chamber through which a substance to be treated is adapted to flow, said chamber being provided with an opening in the side wall thereof, a source of active rays fixedly disposed in said chamber, a transparent tube revolubly disposed therein, and means for revolving said tube, in combination with removable means for closing said opening, said removable means comprising baffle means to direct the flow of the substance being treated through the treating chamber past the source of active rays, and means for wiping a surface of said tube when the tube is rotated and said removable means is in position to close said opening.

22. An active ray treating machine in which substance is adapted to traverse a predetermined course therethrough, comprising a transparent tube and a source of active rays in said tube, in combination with mechanism for wiping a surface of said tube without changing said course while substance is being treated in said machine, said mechanism comprising means to move said tube.

23. A machine for treating substances with active rays comprising a chamber adapted to receive the substance being treated, a pair of spaced, concentric, transparent tubes, disposed within said treating chamber and forming a chamber between said tubes, wiper means in contact with said tubes, means for rotating one of said tubes past the wiper means and means for introducing a fluid medium into, or for withdrawing such medium from, the chamber between said tubes while said tube is being rotated.

24. A machine for treating substances with active rays comprising a treating chamber, a transparent tube disposed within said chamber, a tube wiper in contact with a surface of said tube, said tube, chamber and wiper defining a predetermined course to be traversed by the substance during the treatment thereof, and means for moving said tube to wipe a surface thereof without changing said course.

25. A machine for treating substances with active rays comprising a substance treating chamber, a source of active rays, a pair of concentric transparent tubes forming a filter chamber disposed between said ray source and treating chamber, wiper means mounted in the treating chamber and adapted to wipe the outside surface of the outside tube when said tube is rotated with respect thereto, a second wiper means disposed within said filter chamber and adapted to wipe the outside surface of the inside tube when rotated with respect thereto, and means for rotating the outside tube and the wiper means disposed within the filter chamber to simultaneously wipe the outside surfaces of the tubes.

26. A machine for treating substances with active rays comprising a substance treating chamber, a source of active rays, a pair of concentric transparent tubes forming a filter chamber disposed between said ray source and treating chamber, wiper means mounted in the treating chamber and adapted to wipe the outside surface of the outside tube when said tube is rotated with respect thereto, a second wiper means disposed within said filter chamber and adapted to wipe the outside surface of the inside tube when rotated with respect thereto, said second wiper means being secured to the outside tube, and means for rotating the outside tube and the wiper means to wipe the outside surfaces of the tubes.

27. A machine for treating substances with active rays comprising a substance treating chamber, a source of active rays, a pair of concentric quartz tubes forming a filter chamber disposed between said ray source and treating chamber, wiper means mounted in the treating chamber and adapted to wipe the outside surface of the outside tube when said tube is rotated with respect thereto, a second wiper means disposed within said filter chamber and adapted to wipe the tube surfaces of said chamber when rotated with respect thereto, and means for rotating the outside tube, said means comprising mechanism operable at the will of an operator to rotate said second wiper means, 28. A machine for treating substances with active rays comprising a substance treating chamber, a source of active rays, a pair of concentric transparent tubes forming a filter chamber disposed between said ray source and treating chamber, means for rotatably mounting one of said tubes and stationary means for mounting the other tube, wiper means mounted in the treating chamber and adapted to wipe the outside surface of the outside tube when said tube is rotated with respect thereto, a second wiper means disposed within said filter chamber and adapted to wipe the tube surfaces of said chamber when rotated with respect thereto, means for rotatably mounting said second wiper means independently of the tube mounting, said means comprising an actuating arm, means for locking said arm to the stationary means at the will of an operator, means for rotating the outside tube, and driving means adapted to engage said arm at the will of the operator to rotate said second wiper means.

29. A machine for treating substances with active rays comprising a treating chamber, a pair of concentric quartz tubes and baffle means disposed within said chamber, a source of active rays disposed within said tubes, a tube wiper in said chamber in contact with a surface of the outside tube and means to move said tube to wipe said surface without changing the relationship between said baffle means and wiper.

30. A machine for treating substances with active rays comprising a treating chamber, a source of active rays, and transparent means between said treating chamber and ray source, in combination with wiper means for wiping a surface of said transparent means, said transparent means, wiper means, and chamber defining a predetermined course to be traversed by the substance during the treatment thereof, and mechanism for rendering said wiper means operable without changing said course, said mechanism comprising means for moving said transparent means.

HARRY M. CREIGHTON.
EDWARD C. BERNDT.